(12) United States Patent
Stevens

(10) Patent No.: US 12,518,027 B1
(45) Date of Patent: Jan. 6, 2026

(54) DYNAMIC IPsec SYSTEM AND METHOD

(71) Applicant: Rockwell Collins, Inc., Cedar Rapids, IA (US)

(72) Inventor: James A Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 117 days.

(21) Appl. No.: 18/628,533

(22) Filed: Apr. 5, 2024

Related U.S. Application Data

(60) Provisional application No. 63/536,270, filed on Sep. 1, 2023, provisional application No. 63/536,180, filed on Sep. 1, 2023.

(51) Int. Cl.
    *G06F 21/60* (2013.01)
    *H04L 12/18* (2006.01)
    *H04L 45/64* (2022.01)

(52) U.S. Cl.
    CPC ............ *G06F 21/602* (2013.01); *H04L 12/18* (2013.01); *H04L 45/64* (2013.01)

(58) Field of Classification Search
    CPC ........ G06F 21/602; H04L 12/18; H04L 45/64
    See application file for complete search history.

(56) References Cited

U.S. PATENT DOCUMENTS

| | | |
|---|---|---|
| 6,331,973 B1 | 12/2001 | Young et al. |
| 6,487,186 B1 | 11/2002 | Young et al. |
| 6,504,829 B1 | 1/2003 | Young et al. |
| 6,791,994 B1 | 9/2004 | Young et al. |
| 6,950,418 B1 | 9/2005 | Young et al. |
| 7,397,810 B1 | 7/2008 | Young et al. |
| 7,400,596 B1 | 7/2008 | Robertson et al. |
| 7,813,324 B1 | 10/2010 | Goel et al. |

(Continued)

FOREIGN PATENT DOCUMENTS

| | | | | |
|---|---|---|---|---|
| CN | 107241211 B | * | 6/2020 | ............. H04L 41/04 |
| CN | 113761598 A | * | 12/2021 | ............. G06F 21/79 |

OTHER PUBLICATIONS

Stig Venaas, et al. "MADP Multicast Address Discovery Protocol", IETF Vancouver, Dec. 1, 2007; https://www.ietf.org/proceedings/70/slides/mboned-3.pdf.

*Primary Examiner* — Richard G Keehn
(74) *Attorney, Agent, or Firm* — Suiter Swantz IP

(57) ABSTRACT

A network architecture includes a plurality of networks nodes, where two of more of the network nodes communicate with one another. The network architecture includes a plaintext overlay network situated atop a plaintext underlay network, facilitating communication among the plurality of network nodes via one or more plaintext addresses associated with one or more of the plurality of network nodes. The network architecture further includes a ciphertext overlay network situated atop a cipher text underlay network, facilitating communication among the plurality of network nodes via one or more ciphertext addresses. The network architecture further includes an IP encryption device positioned between the plaintext and ciphertext overlay networks. The IP encryption device associates network addresses with corresponding logical security associations within the plaintext underlay networks and ciphertext overlay networks. The logical security associations are associated with one or more network nodes of the plurality of network nodes.

20 Claims, 10 Drawing Sheets

(56) References Cited

U.S. PATENT DOCUMENTS

| | | |
|---|---|---|
| 7,835,523 B1 | 11/2010 | Mickelson et al. |
| 7,903,566 B2 | 3/2011 | Knapp et al. |
| 7,924,761 B1 | 4/2011 | Stevens |
| 7,995,496 B2 | 8/2011 | Knapp et al. |
| 8,098,708 B2 | 1/2012 | Nieto et al. |
| 8,117,440 B2 | 2/2012 | Pei et al. |
| 8,726,382 B2 | 5/2014 | Knapp et al. |
| 8,762,515 B2 | 6/2014 | Knapp et al. |
| 8,995,275 B1 | 3/2015 | Iovine et al. |
| 9,246,884 B1 | 1/2016 | Pfab et al. |
| 9,848,004 B2 | 12/2017 | Knapp et al. |
| 9,887,974 B2 | 2/2018 | Charan et al. |
| 10,666,619 B2 | 5/2020 | Ding et al. |
| 10,986,076 B1 | 4/2021 | Bendickson et al. |
| 11,050,443 B1 | 6/2021 | Thommana et al. |
| 11,343,715 B1 | 5/2022 | Barbulescu et al. |
| 11,382,143 B1 | 7/2022 | Stevens et al. |
| 11,444,855 B2 * | 9/2022 | Naik ................ H04L 45/02 |
| 11,463,934 B1 | 10/2022 | Kwon et al. |
| 11,601,277 B1 | 3/2023 | Bean et al. |
| 11,606,287 B2 | 3/2023 | Stevens et al. |
| 11,632,143 B1 | 4/2023 | Thommana et al. |
| 2010/0185760 A1 * | 7/2010 | Nakahira ............ H04L 45/64 709/224 |
| 2011/0016313 A1 | 1/2011 | Jin et al. |
| 2013/0061034 A1 | 3/2013 | Walheim |
| 2014/0282817 A1 * | 9/2014 | Singer ................ H04L 63/08 726/1 |
| 2016/0105356 A1 | 4/2016 | Dowdell et al. |
| 2016/0105523 A1 | 4/2016 | Dowdell |
| 2017/0054758 A1 * | 2/2017 | Maino ................ H04L 45/64 |
| 2018/0183581 A1 | 6/2018 | Elbaz et al. |
| 2019/0109713 A1 * | 4/2019 | Clark ................ G06F 21/44 |
| 2019/0109714 A1 * | 4/2019 | Clark ................ G06F 21/53 |
| 2019/0190894 A1 * | 6/2019 | Kapoor .............. H04L 67/02 |
| 2019/0215188 A1 * | 7/2019 | Ethier ............. H04L 9/0618 |
| 2021/0243053 A1 * | 8/2021 | Dunbar .............. H04L 45/64 |
| 2021/0248227 A1 * | 8/2021 | Yang ................ G06F 21/602 |
| 2021/0279358 A1 * | 9/2021 | Teel ................ G06F 21/64 |
| 2022/0345305 A1 * | 10/2022 | Tollefson ........... G06F 21/602 |
| 2022/0360566 A1 * | 11/2022 | Sawant ............. H04L 63/061 |
| 2023/0123456 A1 * | 4/2023 | Dudley ............. H04W 12/106 726/3 |
| 2023/0224246 A1 * | 7/2023 | Saavedra ........... H04L 45/64 370/389 |
| 2023/0261990 A1 * | 8/2023 | Chacko ............. H04L 45/64 709/238 |

\* cited by examiner

DYNAMIC IPsec SYSTEM AND METHOD

CROSS-REFERENCE TO RELATED APPLICATIONS

The present application claims the benefit under 35 U.S.C. § 119(e) of U.S. Provisional Patent Application Ser. No. 63/536,270, filed Sep. 1, 2023, titled "MANET Integration with IPsec", naming James A. Stevens as inventor and U.S. Provisional Patent Application Ser. No. 63/536,180, filed Sep. 1, 2023, titled "MANET Integration with IPsec", naming James A. Stevens as inventor, both of which are incorporated herein by reference in the entirety.

TECHNICAL FIELD

The present invention generally relates to network security and communications protocols, and, more particularly, to dynamic IPsec systems and methods for discovering High Assurance Internet Protocol Encryptor (HAIPE) black-to-red address mappings and identifying network nodes.

BACKGROUND

IPsec, short for Internet Protocol Security, is a widely used suite of protocols employed to secure Internet Protocol (IP) communications. In general, IPsec was developed to address the growing need for robust security mechanisms in network communication. IPsec provides a comprehensive framework for ensuring confidentiality, integrity, and authenticity of data transmitted over IP networks. It operates at the network layer of the OSI model, enabling secure communication between network devices by encrypting and authenticating IP packets. IPsec offers a range of security services, including encryption, authentication, and key management, facilitating secure virtual private network (VPN) connections, secure data transmission across public networks, and protection against various network-level threats. With its versatility and standardization implementation, IPsec has become an integral component of modern network security architectures, offering organizations a reliable means to safeguard their sensitive data and communications.

However, traditional implementations of IPsec present certain challenges, particularly in dynamic or tactical network environments. Conventional IPsec setups often rely on preconfigured Security Associations (SAs) and manual key management which may prove difficult to preplan and configure for networks characterized by dynamic node participation (i.e., where nodes may enter or exit a network dynamically). Alternatively, conventional IPsec setups often rely upon discovery protocols which require centralized or hierarchical servers, which can result in high overhead and increased complexity, especially in networks with frequent node movements or where rapid network entry is critical. Moreover, the centralized or hierarchical nature of traditional IPsec architectures may not be well-suited for mobile ad-hoc networks (MANETs) or scenarios where nodes dynamically join and leave the network. There is therefore a need to develop systems and methods to cure the above deficiencies.

SUMMARY

A network architecture is disclosed in accordance with one or more embodiments of the present disclosure. In embodiments, the network architecture includes a plurality of network nodes, where two or more network nodes are configured to communicate with each other among the plurality of network nodes. In embodiments, the network architecture includes a plaintext overlay network situated atop a plaintext underlay network, the plaintext overlay and underlay networks configured to facilitate communication among the plurality of network nodes via one or more plaintext addresses associated with one or more nodes of the plurality of network nodes. In embodiments, the network architecture includes a ciphertext overlay network situated atop a ciphertext underlay network, the ciphertext overlay and underlay networks configured to facilitate communication among the plurality of network nodes via one or more ciphertext addresses. In embodiments, the network architecture includes an IP encryption device positioned between the plaintext and ciphertext overlay networks, the IP encryption device configured to associate network addresses with corresponding logical security associations within the plaintext underlay networks and ciphertext overlay networks, where the logical security associations are associated with one or more network nodes of the plurality of network nodes.

A method is disclosed, in accordance with one or more embodiments of the present disclosure. In embodiments, the method may include, but is not limited to, providing a plurality of network nodes within a network architecture, where two or more network nodes are configured to communicate with each other among the plurality of network nodes. In embodiments, the method may include, but is not limited to, constructing a plaintext overlay network atop a plaintext underlay network, where the plaintext overlay and underlay networks are configured to facilitate communication among the plurality of network nodes via one or more plaintext addresses associated with one or more nodes of the plurality of network nodes. In embodiments, the method may include, but is not limited to, constructing a cipher text overlay network atop a ciphertext underlay network, where the ciphertext overlay and underlay networks are configured to facilitate communication among the plurality of network nodes via one or more ciphertext addresses. In embodiments, the method may include, but is not limited to, positioning an IP encryption device between the plaintext and ciphertext overlay networks. In embodiments, the method may include, but is not limited to, configuring the IP encryption device to associate network addresses with corresponding logical security associations within the plaintext underlay networks and ciphertext overlay networks, where the logical security associations are associated with one or more network nodes of the plurality of network nodes.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
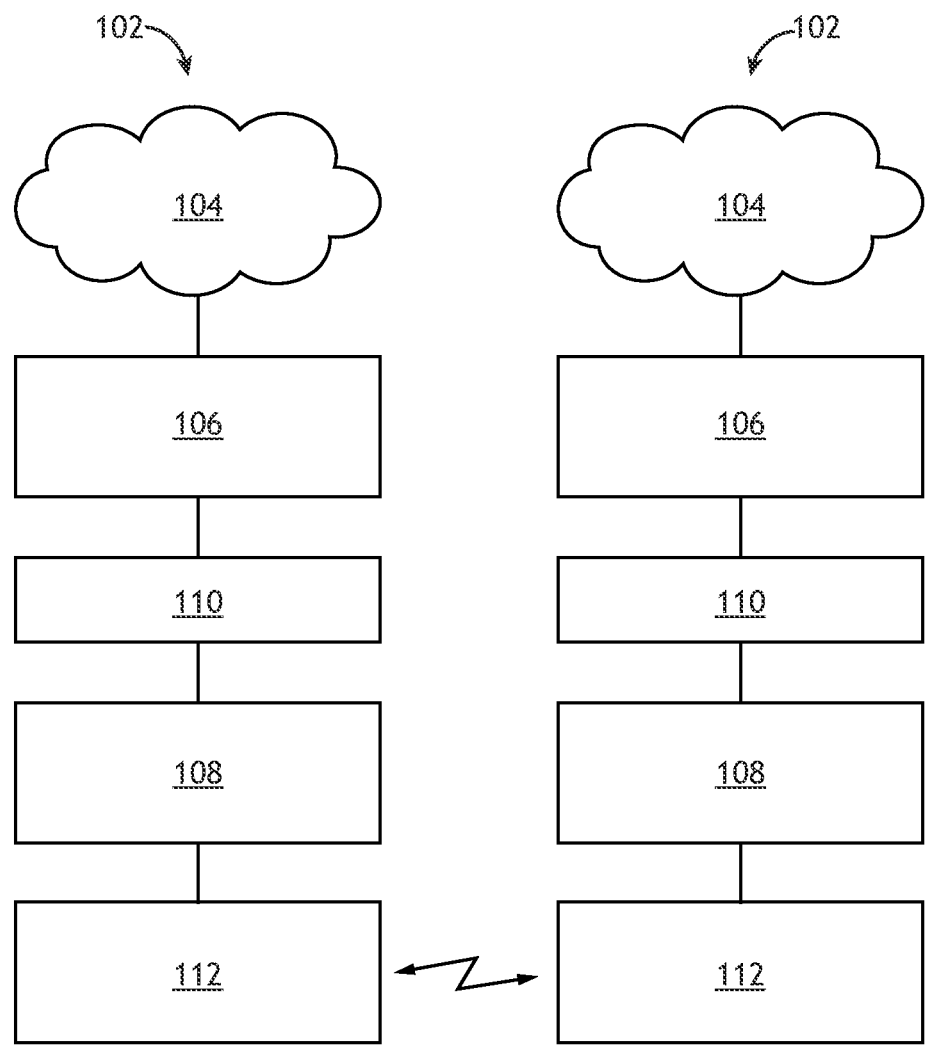
FIG. 1 is a simple diagram of a network architecture illustrating two network nodes in communication with one another, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

In embodiments, the implementation of IPsec in securing communication with tactical and dynamic networks plays a pivotal role in ensuring data confidentiality, integrity, and authenticity. IPsec offers a robust framework for encrypting and authenticating IP packets, thereby safeguarding sensitive information exchanged over networks. However, the deployment of IPsec in dynamic and rapidly changing environments presents unique challenges that necessitate tailored approaches to its implementation.

One conventional method employed to integrate IPsec within tactical networks is the utilization of a HAIPE Discovery service in conjunction with centralized discovery servers, followed by Internet Key Exchange (IKE). In this approach, the HAIPE Discovery service serves as a mechanism for discovering and identifying HAIPE device information, including their IP addresses, capabilities, and security parameters. Subsequently, the IKE protocol facilitates the negotiation of security associations (SAs) and cryptographic keys between communicating endpoints. This method, while effective in establishing secure communication channels, often incurs high overhead and latency, particularly in low data rate tactical networks due to the reliance on centralized discovery servers and the extensive negotiation process involved in IKE.

Alternatively, another conventional method involves the preplacement of cryptographic keys and addressing information on participating devices within the network. In this approach, SAs and cryptographic keys are preconfigured on the devices based on predefined security policies and requirements. Additionally addressing information, including IP addresses and routing information, is preestablished to ensure seamless communication between endpoints. While this method offers rapid network entry and reduced overhead, it poses challenges in terms of scalability and flexibility, as the preconfiguration process can be complex and cumbersome, especially in large-scale dynamic networks. Moreover, the inability to dynamically adjust security parameters may limit the adaptability of the network to evolving threats and operational requirements.

Accordingly, embodiments of the present disclosure are directed to a system and method which cure one or more shortfalls of the previous approaches identified above. Embodiments of the present disclosure are directed to a dynamic IPsec system and method. In particular, the dynamic IPsec system and method may be designed for discovering HAIPE black-to-red address mappings and identifying accessible nodes within a particular network.

It is contemplated herein that the approaches described throughout the present disclosure may be used in both unicasting and multicasting situations.

FIG. 1 is a simple diagram of a network architecture 100 illustrating two network nodes 102 in communication with one another, in accordance with one or more embodiments of the present disclosure.

In embodiments, the network architecture 100 comprises a plurality of network nodes 102 in which two or more network nodes 102 participate in communication and data exchange within the network 100. For example, each network node 102 may include, but is not limited to, network devices 104 or entities connected to the network 100 (e.g., IP hosts 103, routers 105, servers, or other like network-enabled devices).

Figure 3:
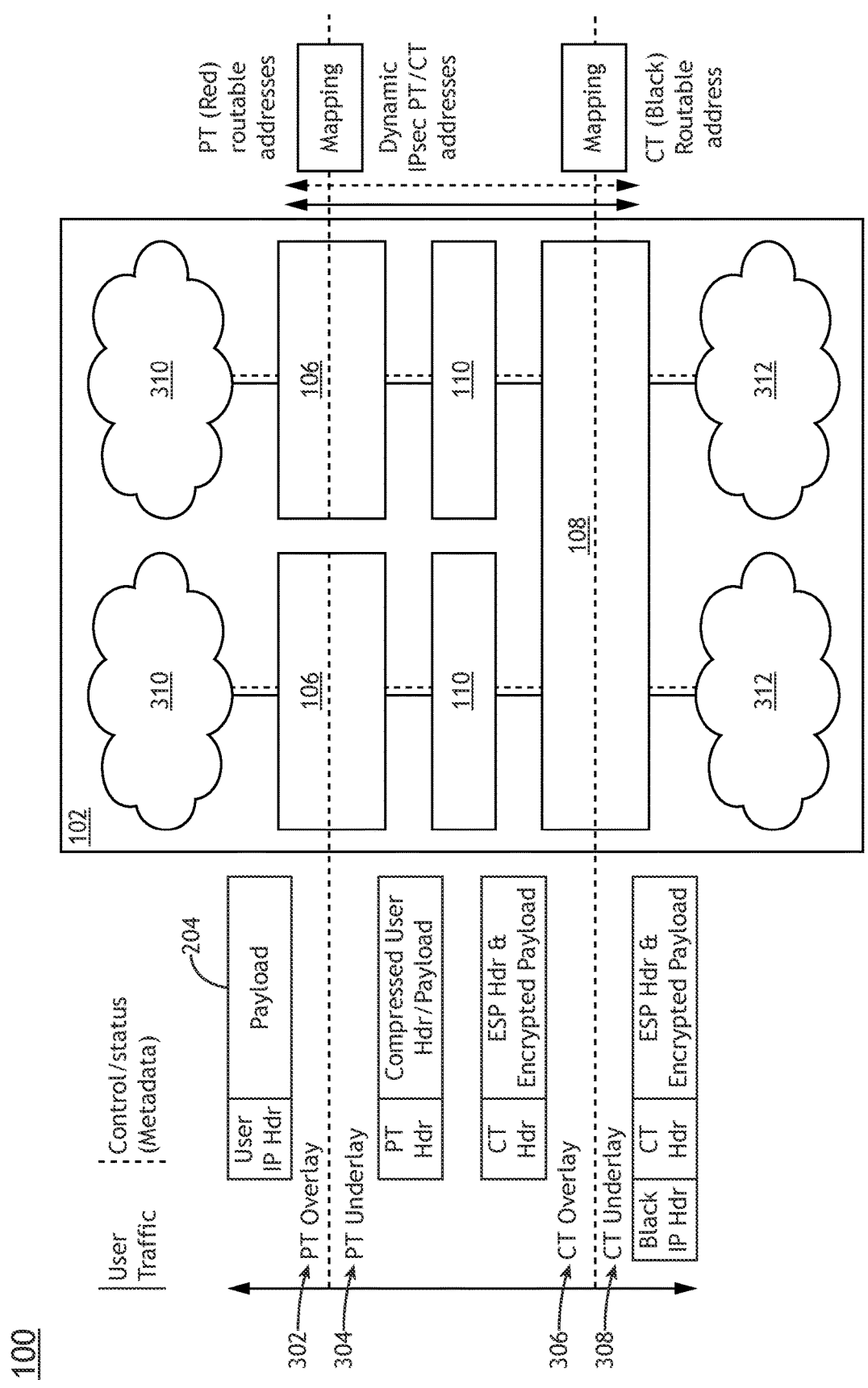
FIG. 3 is a simple diagram of a node within the network architecture interacting with the plaintext and ciphertext overlay and underlay networks, in accordance with one or more embodiments of the present disclosure.

In embodiments, the network architecture 100 establishes two or more overlay and underlay networks. For example, the network architecture 100 may involve the establishment of a plaintext (PT) or red overlay 302 and underlay 304 network, and a ciphertext (CT) or black overlay 306 and underlay 308 network, as shown in FIG. 3.

In embodiments, the red and black overlay 306 and underlay 308 networks facilitate communication among the plurality of network nodes 102 through plaintext and ciphertext addresses associated with each node 102 of the plurality of network nodes 102. The red overlay network 302 may be situated above the corresponding red underlay network 304 to provide a logical abstraction for routing and addressing. The black overlay network 306 may similarly be situated above the underlying black underlay network 308.

In embodiments, one or more nodes 102 within the network architecture 100 include a plaintext convergence function module 106 and a ciphertext convergence function module 108. For example, these convergence function modules 106, 108 may be designed to handle the translation, encapsulation, and routing of data packets between the PT and CT overlay 302, 306 and underlay 304, 308 networks.

In embodiments, the PT convergence module 106 serves as an intermediary component responsible for managing the translation and routing of data packets between the plaintext overlay 302 and underlay 304 networks. For example, the PT convergence module 106 may include PT convergence functions such as, but not limited to, address translation, encapsulation, and QoS mapping. During address translation, the PT convergence function may translate network addresses between the PT overlay 302 and underlay 304 networks, ensuring compatibility and communication between network nodes 102 operating within these distinct domains. During encapsulation, the PT convergence function may encapsulate these packets using established protocols such as, but not limited to RFC 2003 IP in IP encapsulation, in response to receiving the data packets from the PT overlay network 302. Additionally, the PT convergence function may incorporate QoS mapping capabilities, aligning the desired QoS parameters of data packets within the plaintext overlay network 302 with corresponding QoS settings in the plaintext underlay network 304. This ensures consistent and optimized network performance across varying network conditions.

In embodiments, the CT convergence module 108 may serve as an intermediary component responsible for managing the translation and routing of data packets between the ciphertext overlay 306 and underlay 308 networks. For example, the CT convergence module 108 may include CT convergence functions such as, but not limited to, address mapping, traffic encryption, and QoS mapping. During address mapping, the CT convergence function may map network addresses between the ciphertext overlay 306 and underlay 308 networks, facilitating secure and efficient communication between network nodes 102 operating within these distinct security domains. During traffic encryption, upon receiving data packets from the CT overlay network 306 of encrypted packets from the IPsec (HAIPE) devices 110, the CT convergence function may apply additional encryption algorithms, such as those specified in the IPsec framework for transport layer security (TLS), to ensure the confidentiality and integrity of black overlay addressing information. This encryption process safeguards sensitive information from unauthorized access or tampering during transit. Further, the CT convergence functions may provide QoS provisioning capabilities, allowing for the alignment of QoS parameters between the CT overlay 306 and underlay 308 networks. By prioritizing and managing network traffic based on predefined QoS criteria, the CT convergence function may optimize network performance and resource utilization.

In embodiments, the network architecture 100 includes at least one IP encryption device 110 responsible for securing communications over the IP networks. For example, the IP encryption device 110 may be positioned between the plaintext and ciphertext overlay networks 302, 306. By way of another example, the IP encryption device 110 may be configured to associate network addresses with corresponding logical security associations within the plaintext underlay 304 networks and the ciphertext overlay networks 306. The logical security associations may be associated with one or more network nodes 102. In embodiments, the network architecture 100 further includes a MANET (Mobile Ad hoc Network) waveform 112.

In embodiments, the IP encryption device 110 is responsible for mapping the red or black IP addresses to IPsec IDs. For example, the IP encryption device 110 may maintain a mapping table or database which correlates the red or black IP addresses with their corresponding IPsec IDs. This mapping table may be configured based on predefined rules or policies established by network administrators. For instance, when network traffic passes through the IP encryption device 110, it may examine the source and destination IP addresses of the packets and consult the mapping table to determine the appropriate IPsec IDs to apply to the communication session. This ensures that the communication remains secure and compliant within the network's security policies. This allows user red overlay networks 302 to dynamically plug and play into the PT convergence function above the PT underlay networks 304 with its logical IPsec IP address.

The IP encryption device 110 may be configured as, but is not limited to, an Internet Protocol Security (IPsec), a High Assurance Internet Protocol Encryptor (HAIPE), a Network and Information Infrastructure Internet Protocol Network Encryption (NINE), or an IPsec Minimum Essential Interoperability Requirements (MPIER) device.

Internet Protocol Security (IPsec) is a suite of protocols and standards developed to provide secure communication over IP networks. It is based on various RFCs (Request for Comments), including RFC 4301, which outlines the basic IPsec architecture for both IPv4 and IPV6. Key components of IPsec include the IP Authentication Header (AH) 202 and the IP Encapsulating Security Payload (ESP), defined in RFCs 4302 and 4303, respectively.

Figure 2A:
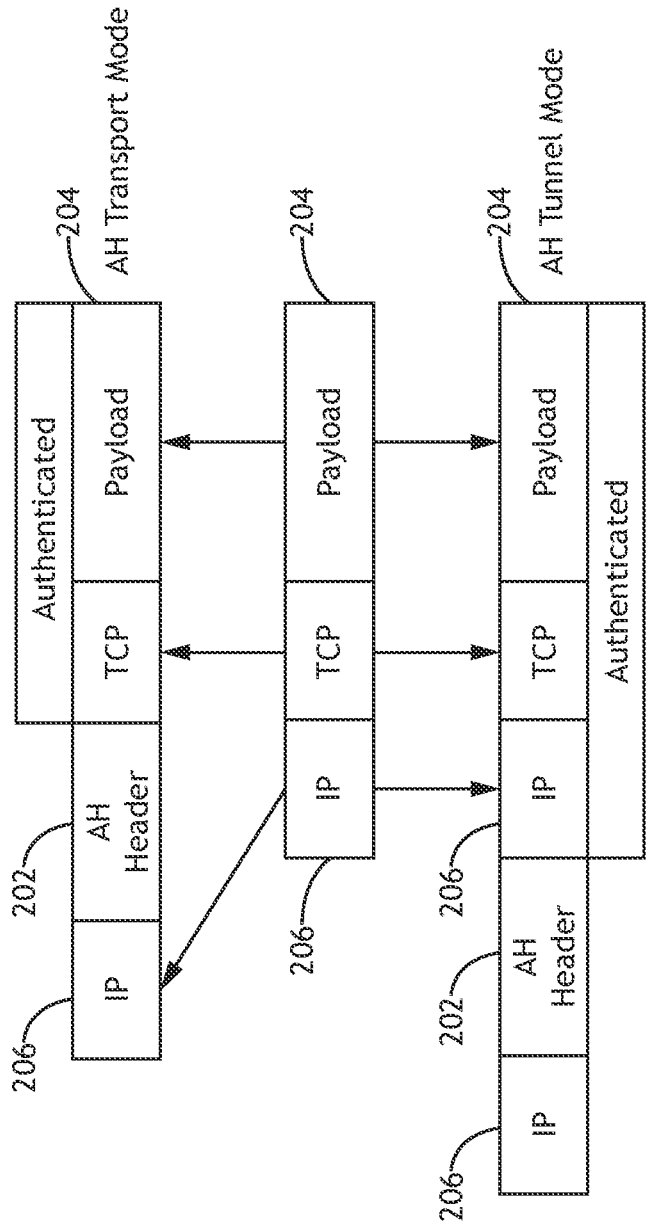
FIG. 2A illustrates the transmission of IP packets encapsulated with Authentication Header (AH) in both Transport Mode and Tunnel Mode, in accordance with one or more embodiments of the present disclosure.

FIG. 2A illustrates the transmission of IP packets encapsulated with Authentication Header (AH) 202 in both Transport Mode and Tunnel Mode, in accordance with one or more embodiments of the present disclosure. The Authentication Header (AH) 202 provides several security features. The AH requires attaching a special header to every IP packet with specific information that is later used to certify the packet's legitimacy.

As mentioned throughout the present disclosure, the payload 204 refers to the actual data carried within a network packet, excluding any protocol-specific headers or control information. It represents the information being transmitted between networked devices and can encompass various types of data, including text, images, audio, or video content. It is further noted that Internet Protocol (IP) may refer to a fundamental protocol responsible for addressing and routing data packets across network boundaries. The IP header 206 is a crucial component of an IP packet that contains essential information, such as the source and destination IP addresses, packet length, and protocol type. It serves as the foundational framework for transmitting data packets across interconnected networks.

Figure 2B:
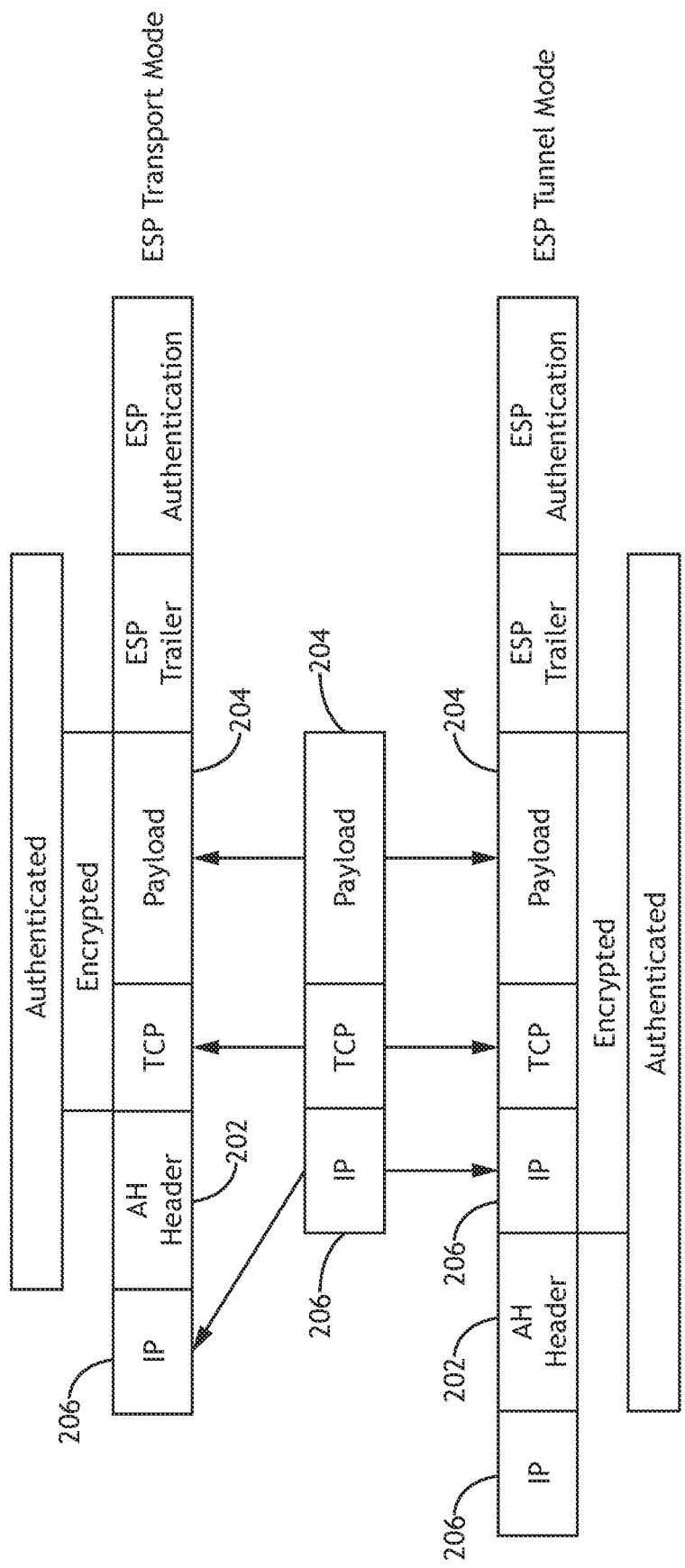
FIG. 2B illustrates the transmission of IP packets encapsulated with Encapsulating Security Payload (ESP) in both Transport Mode and Tunnel Mode, in accordance with one or more embodiments of the present disclosure.

FIG. 2B illustrates the transmission of IP packets encapsulated with Encapsulating Security Payload (ESP) in both Transport Mode and Tunnel Mode, in accordance with one or more embodiments of the present disclosure. There are three parameters which provide most of the security. First, the Security Parameter Index (SPI) indicates how the security packet is established. The SPI affiliates the packet with a preset Security Association (SA) between two hosts or two networks in one direction communication.

For instance, an SA may indicate what kind of traffic is allowed through a secure channel, or how long a secure alliance between the two hosts will last. The sequence number represents the number of sent packets using the current SA, and the sequence number provides the information necessary to detect a DoS or replay attack. At any given point in a data transmission, a secure receiver will only expect packets having sequence numbers falling inside a small window centered around the last successful one received, allowing for the fact that packets may be shuffled by the network since they left the sender. This creates a sliding window of acceptable packets, outside of which any packets are dropped. The real strength behind AH is the authentication data itself. The variable length field includes an encrypted payload 204 which is used to verify the integrity of the data itself. It should be noted that the data itself is plaintext, and the data could be read by anyone in the path of the flow. However, any modifications to the data would be detected and the packet instantly dropped. The original IP header 206 is also authenticated, which verifies the users involved in the connection, as well as the AH itself to protect the unencrypted fields.

AH by itself offers protection, but not confidentiality. The Encapsulating Security Payload (ESP) instead provides the assuredness of full encryption. In this case, the full data packet is scrambled in such a way that it can only be read by the intended recipient. When in IPsec tunnel mode, the original IP header 206 is also included in this encrypted payload 204 such that the identity of the end users is hidden as well.

The packet may be further secured by optional padding which can be used to mislead any analysis based on packet size. The rest of the ESP header parameters may be similar to the Authentication Header 202. In a high security design, encryption and authentication may be enabled and the combined result is a modified version of the ESP header with the inclusion of the Authentication data field. In this case, authentication occurs over the full encrypted packet as well as all headers.

Another critical aspect of IPsec is the Internet Key Exchange (IKEv2) Protocol, specified in RFC 4306, which facilitates the negotiation and management of security associations (SAs) between communicating entities. SAs are configuration information stored within IPsec for establishing and maintaining secure encryption sessions. IPsec operates primarily within two modes: Tunnel mode, which secures communication between routers and/or hosts, and Transport mode, which secures communication between individual hosts.

In IPsec, SAs contain essential parameters such as source and destination plaintext (PT) and ciphertext (CT) addresses, as well as cryptographic keys used for encryption and decryption. For unicast communication, SAs specify the addresses of the communicating endpoints, along with the encryption key name. On the other hand, multicast SAs include PT and CT multicast addresses and support the use of a key name, with no specific source addresses defined. In military environments, IPsec is often implemented using Type 1 encryption, which supports the transmission of classified traffic up to Top Secret/Sensitive Compartmented Information (TS/SCI) levels. Specialized devices such as the US High Assurance Internet Protocol Encryptor (HAIPE) and NATO Networked Information Infrastructure (NII) IP Network Encryption (NINE) are designed to provide secure IPsec communication in military and government networks.

While IPsec offers robust security features, certain implementations, particularly those designed for military use, may impose additional restrictions. For instance, some implementations may not support wildcards in multicast SA addresses, limiting the flexibility of address configuration. However, features like IGMP (Internet Group Management Protocol) bypass between plaintext and ciphertext for multicast SAs are commonly supported, enhancing the efficiency of multicast communication in secure environments.

With the availability of both the AH and ESP, a very strong framework for security is available for use with IP packets. However, there remains a need to establish a Security Association between two independent networks. If one host is unsure of the legitimacy of the other, even infinitely strong encryption will not result in complete security. A system needs to be in place to negotiate secret keys securely between hosts before any communication can exist. The Internet Security Association and Key Management Protocol (ISAKMP) as defined by the IETF defines ground rules for such a system. ISAKMP begins with some assumption that the connections hosts know a little about themselves. At the very least, there needs to be some peer authentication based on some known piece of information. This could involve, for example, a public key exchange or, less commonly, a pre-shared key that has been mutually agreed upon by the two hosts. Establishing a basic level of communication is called Phase 1. Having confirmed the authenticity of each other, the two hosts create a shared secret and establish an ISAKMP Security Association (ISAKMP-SA). An ISAKMP-SA delineates a way to communicate securely, by using mutually decided parameters such as encryption methods and timeout periods. Once again, if the parameters do not match, then there is a breach of trust and communication is dropped. Through the ISAKMP-SA, a Phase 2 level agreement may be established.

In Phase 2 communication, new secret, typically symmetric, keys are created for each IPsec Security Association (IPsec-SA). These are now used as agreements to pass data from specific points in the secure network (not necessarily the host establishing the secure tunnel) to other hosts on the other side. Each connection has its own keys and particular security parameters by which they need to comply.

FIG. 3 illustrates the network architecture 100 and data flow within a node 102 interfacing with the plaintext and ciphertext overlay 302, 306 and underlay 304, 308 networks, in accordance with one or more embodiments of the present disclosure. The network node 102 may incorporate at least one of one or more security enclaves 310, one or more PT and CT convergence modules 106, 108, and one or more IP encryption devices 110.

In embodiments, the node 102 comprises either one security enclave 310 or two or more distinct security enclaves 310. For example, a first enclave 310 may be configured as a yellow enclave 310 to facilitate secure communication and data exchange within the network 100 infrastructure. Within the yellow security enclave 310, user traffic and control/status metadata may be transmitted to and from a yellow PT convergence module 106. The module 106 may employ dynamic IPsec techniques to establish secure communication channels over the plaintext overlay 302 and underlay 304 networks. For instance, the yellow PT convergence module 106 may interface with an IP encryption device 110 (e.g., HAIPE device), which further secures the data transmission using cryptographic protocols.

In embodiments, a second enclave 310 may be configured as a red enclave 310 to facilitate secure communication and data exchange within the network 100 infrastructure. In a similar manner, the red security enclave 310 within the node 102 may operate in parallel with the yellow enclave 310. For instance, user traffic and control/status metadata originating from the red enclave 310 may be processed by a red PT convergence module 106, employing dynamic IPsec for secure communication over the plaintext networks 302, 304. Further, the output from the red PT convergence module 106 may be transmitted to the IP encryption device 110 (e.g., HAIPE device), which ensures the integrity and confidentiality of data transmission.

In some embodiments, information assurance and data integrity are achieved through the use of data IP encryption devices 110, such as the NSA-approved Type 1 High Assurance Internet Protocol Encryptors (HAIPE).

In embodiments, data from the respective IP encryption devices 110 is then forwarded to the CT convergence module 108, which integrates dynamic IPsec and resilient HetNet technologies. The module 108 ensures the robustness and reliability of data transmission over the ciphertext overlay 306 and underlay 308 networks. The CT convergence module 108 may further be configured to interface with the black core networks 312, facilitating seamless integration with the broader network 100 infrastructure.

Figure 4:
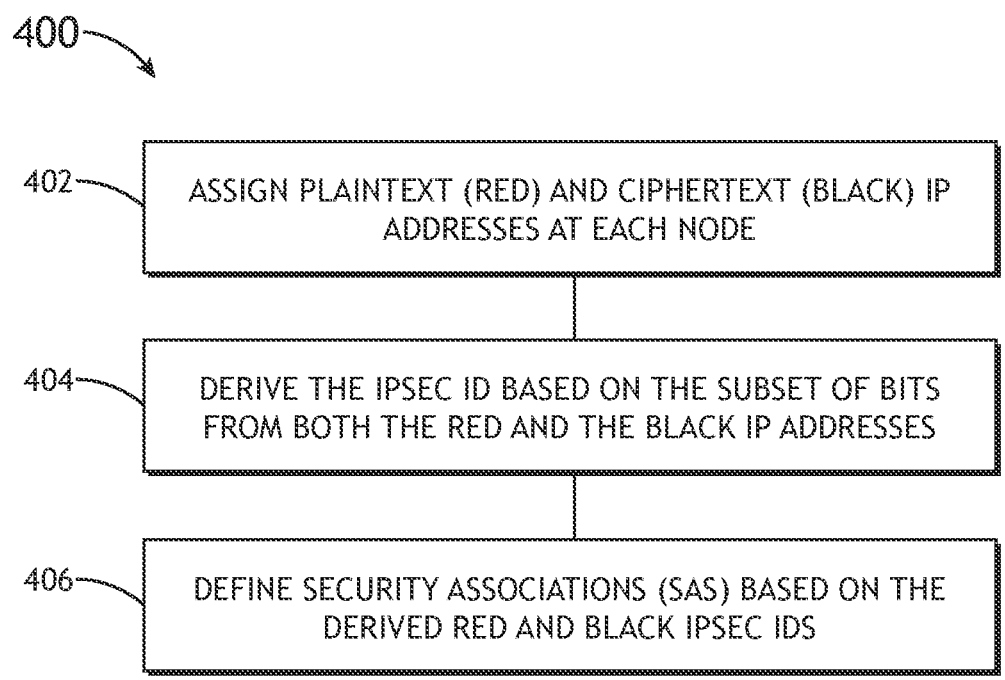
FIG. 4 is a flow diagram depicting a method for utilizing IPsec IDs as logical identifiers within the network architecture, in accordance with one or more embodiments of the present disclosure.

FIG. 4 is a flow diagram illustrating steps performed in a method 400 for utilizing IPsec IDs as logical identifiers within the network architecture 100, in accordance with one or more embodiments of the present disclosure. This approach may involve mapping plaintext (red) IPsec IDs and ciphertext (black) IPsec IDs at the same node 102 in a deterministic manner. It is noted herein that the embodiments and enabling technologies described previously herein in the context of the dynamic IPsec system should be interpreted to extend to the method 400. It is further noted, however, that the method 400 is not limited to the architecture of the dynamic IPsec system. It is further noted herein the method or process 400 is not limited to the steps and/or sub-steps provided. The method or process 400 may include more or fewer steps and/or sub-steps. The method or process 400 may perform the steps and/or sub-steps simultaneously. The method or process 400 may perform the steps and/or sub-steps sequentially, including in the order provided or an order other than provided. Therefore, the above description should not be interpreted as a limitation on the scope of the disclosure but merely an illustration.

In embodiments, the method 400 includes a step 402 of assigning plaintext (red) and ciphertext (black) IP addresses at each node 102 within the network 100. For example, an administrator may allocate specific IP address ranges for both the red underlay network 304 above the IPsec device 110 and black overlay networks 306 below the IPsec device 110. These IP addresses may be chosen based on network 100 requirements, such as the number of nodes 102, network topology, security considerations, and scalability needs. By way of another example, the administrator may assign the IP addresses manually or automatically through network management tools.

In embodiments, the method 400 includes a step 404 of deriving the IPsec ID based on the assigned IP addresses. For example, a range of bits may be selected from the red IP address to form the logical red IPsec ID. By way of another example, a range of bits may be selected from the black IP address to form the logical black IPsec ID. Following the determination of both the red and black IPsec IDs, it may be beneficial to ensure that the mapping between the red and black IPsec IDs is deterministic and consistent across all nodes 102 within the network 100.

In embodiments, the method 400 includes a step 406 of defining security associations (SAs) using the derived red and black IPsec IDs. For example, one or more default SAs may be defined using the derived red and black IPsec IDs. By way of another example, unicast SAs may be defined. The unicast SAs may include two SAs for each potential link between nodes 102, which allows for bidirectional communication. By way of another example, multicast SAs may be defined. The multicast SAs may contain one SA for every node 102 in the network 100 to facilitate communication with multiple recipients.

Figure 5:
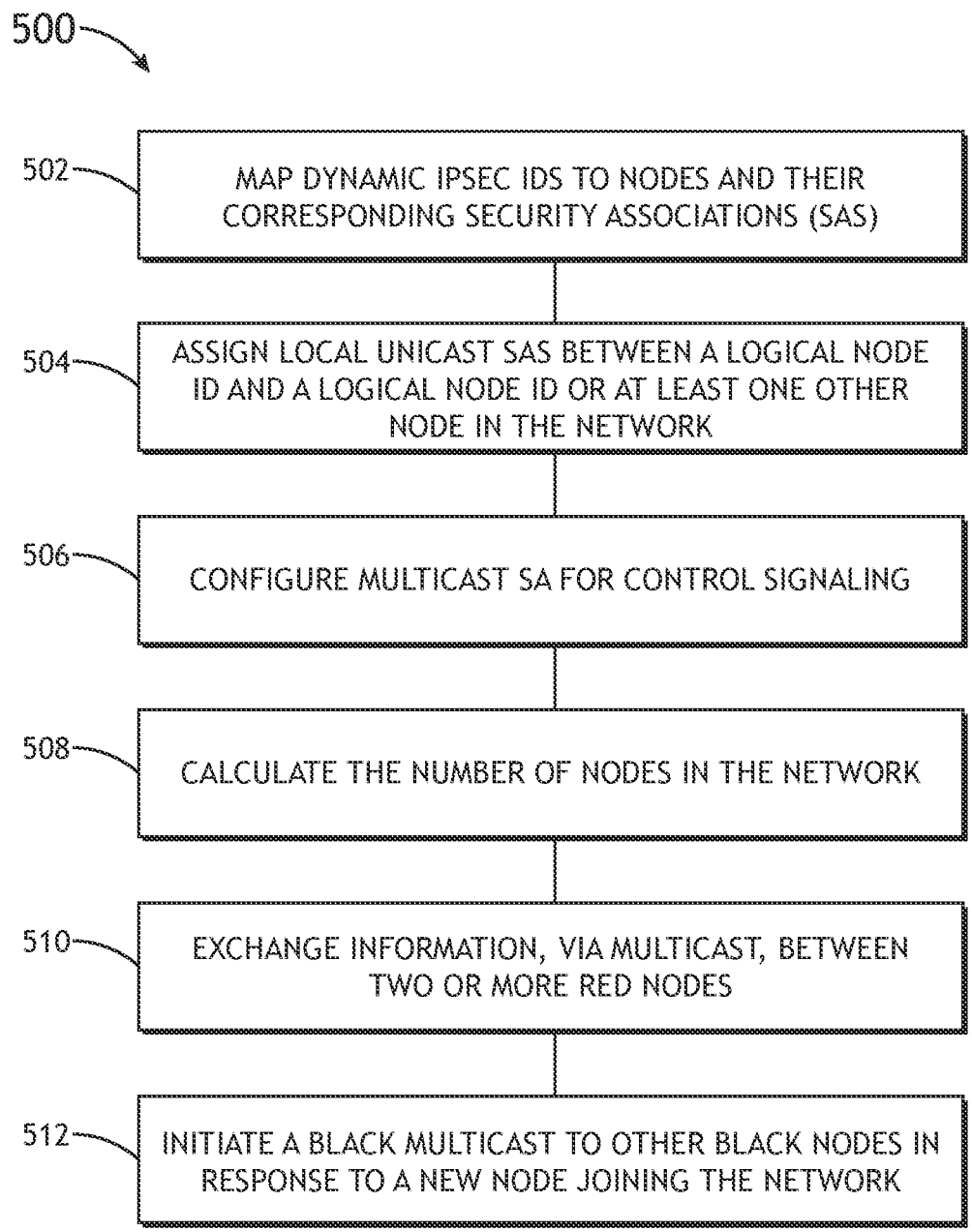
FIG. 5 is a flow diagram depicting a method for implementing unicast SA, in accordance with one or more embodiments of the present disclosure.

FIG. 5 is a flow diagram illustrating steps performed in a method 500 for implementing a unicast SA, in accordance with one or more embodiments of the present disclosure. It is noted herein that the embodiments and enabling technologies described previously herein in the context of the dynamic IPsec system should be interpreted to extend to the method 500. It is further noted, however, that the method 500 is not limited to the architecture of the dynamic IPsec system. It is further noted herein the method or process 500 is not limited to the steps and/or sub-steps provided. The method or process 500 may include more or fewer steps and/or sub-steps. The method or process 500 may perform the steps and/or sub-steps simultaneously. The method or process 500 may perform the steps and/or sub-steps sequentially, including in the order provided or an order other than provided. Therefore, the above description should not be interpreted as a limitation on the scope of the disclosure but merely an illustration.

In embodiments, the method 500 includes a step 502 of mapping dynamic IPsec IDs to nodes 102 and their corresponding SAs. For example, the mapping of dynamic IPsec IDs involves the assignment of unique identifiers to each node 102 in the network 100.

In embodiments, the method 500 includes a step 504 of assigning unicast SAs between a pair of network nodes 102 for every potential node 102 within the network 100. These SAs include the logical red node IDs without involving any keys. For example, when two or more network nodes 102 intend to communicate, they identify each other through their respective IP addresses or IPsec IDs. The communicating nodes 102 may negotiate security parameters such as encryption algorithms, integrity algorithms, and key lifetimes. This negotiation often occurs using protocols like internet key exchange (IKE). For instance, once the security parameters are agreed upon, the nodes 102 may establish SAs for unicast communication. Each node 102 may create two SAs: one for outbound traffic and one for inbound traffic.

In embodiments, the method 500 includes a step 506 of establishing a multicast SA for control signaling. For example, a black multicast ID may be utilized for signaling between black routers and a red multicast ID may be utilized for signaling between red routers. By way of another example, one or more network nodes 102 participating in control signaling may identify a specific multicast group dedicated to control messages. This multicast group may be used exclusively for transmitting control and signaling information. A multicast SA may be configured for the identified control signaling multicast group. For instance, the multicast SA may include parameters such as, but not limited to, the multicast group address, encryption keys, integrity protection settings, and other relevant parameters.

The details of the multicast SA may be distributed to all participating nodes 102 within the network 100. This distribution ensures that each node 102 is aware of the parameters of the multicast SA and can participate in control signaling activities. Nodes 102 may utilize the established multicast SA to transmit control and signaling messages to the designated multicast group. These control messages may include network topology updates, routing information, status updates and other relevant network management information.

In embodiments, the method 500 includes a step 508 of calculating a number of nodes 102 in the network 100. For example, the number of nodes 102 in the network 100 may be determined by subtracting one from the total number of SAs and then dividing that new total in half. This calculation may account for the bidirectional nature of unicast SAs between pairs of nodes 102.

In embodiments, the method 500 includes a step 510 of exchanging information, via multicast, between two or more red nodes 102. This exchange may help other red nodes 102 to learn the mappings between red and black IDs as nodes 102 join or leave the network 100. For example, the red multicast may include all red topology information to other underlay red node IDs as well as the red overlay network 302 at the transmitter node 102.

In embodiments, the method 500 includes a step 512 of, in response to a new node 102 joining the network 100, the black PT Convergence initiating a black multicast to other black PT Convergence functions at other nodes 102 in the network 100 to announce its presence. The black broadcast may include, but not limited to, IP addresses or waveform Layer 2 node IDs of black underlay networks 308 attached to the transmitting node 102, to facilitate connectivity establishment.

Figure 6:
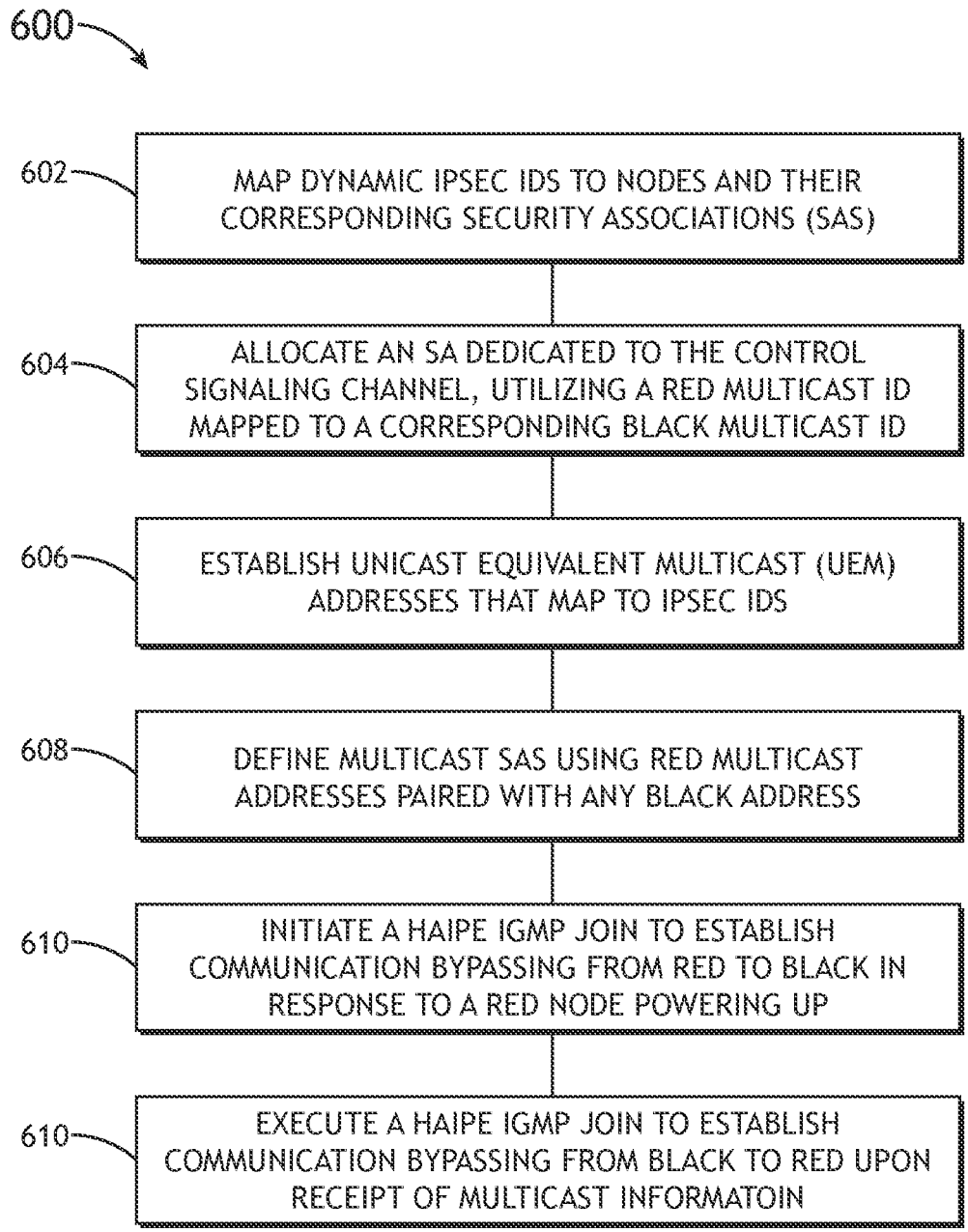
FIG. 6 is a flow diagram depicting a method for implementing a multicast SA, in accordance with one or more embodiments of the present disclosure.

FIG. 6 is a flow diagram illustrating steps performed in a method 600 for implementing a multicast SA, in accordance with one or more embodiments of the present disclosure. It is noted herein that the embodiments and enabling technologies described previously herein in the context of the dynamic IPsec system should be interpreted to extend to the method 600. It is further noted, however, that the method 500 is not limited to the architecture of the dynamic IPsec system. It is further noted herein the method or process 600 is not limited to the steps and/or sub-steps provided. The method or process 600 may include more or fewer steps and/or sub-steps. The method or process 600 may perform the steps and/or sub-steps simultaneously. The method or process 600 may perform the steps and/or sub-steps sequentially, including in the order provided or an order other than provided. Therefore, the above description should not be interpreted as a limitation on the scope of the disclosure but merely an illustration.

In embodiments, the method 600 includes a step 602 of configuring one or more multicast SAs for the network 100. For example, network administrators or configuration management systems may define the parameters of the multicast SA. Such parameters may include, but are not limited to, a multicast group address, encryption keys, integrity protection settings, lifetime or expiration time, and the like.

In embodiments, once the parameters are defined, they are distributed to the participating network nodes 102. This distribution may occur through various means, including manual configuration, and automated provisioning systems. For instance, each node 102 that receives the SA configuration may update its security policy database or SA database with the newly defined multicast SA.

Upon receiving the SA configuration, nodes 102 may activate SA according to the specified parameters. Activation involves initializing the necessary cryptographic mechanisms, such as loading encryption keys into the security processing modules, enabling encryption and integrity protection algorithms, and setting up the multicast group membership.

In embodiments, the method 600 includes a step 604 of allocating an SA dedicated to the control signaling channel. For example, a red multicast ID may be mapped to a black multicast ID. The black multicast ID may be used for signaling between two black routers, and a red multicast ID may be used for signaling between two red routers.

In embodiments, the method 600 includes a step 606 of establishing unicast equivalent multicast (UEM) addresses that map to red underlay and black overlay IPsec IDs. For example, a single network node 102 with the corresponding IPsec ID may join the UEM multicast group, enabling unicast traffic delivery.

In embodiments, the method 600 includes a step 608 of defining multicast SAs using red multicast addresses paired with any black network address. For example, the number of multicast SAs may correspond to the total number of nodes 102 within the network 100 minus one, if only multicast SAs are defined. If both multicast and unicast SAs are defined, then the total number of nodes 102 within the network 100 may correspond to the total number of nodes 102 number of SAs minus one and then dividing that total by three.

In embodiments, the method 600 includes a step 610 of initiating a HAIPE IGMP join to establish communication bypassing from red to black in response to a red nod powering up that corresponds to the UEM of the red node 102.

In embodiments, the method 600 includes a step 612 of executing a HAIPE IGMP join to establish communication bypassing from black to red upon receipt of multicast information. For example, this allows the red side to discover other red nodes 102 and their corresponding black UEMs facilitating black to red HAIPE discovery. By way of another example, red nodes 102 may leverage the established communications channels to perform exchanges with other red nodes 102. This enables efficient communication and coordination within the red side of the network 100. It is noted herein that nodes 102 desiring separate encryption links may perform a pairwise IKE to set up a link.

In embodiments, the network architecture 100 may further include a quality of service (QOS) mapping mechanism. For example, the QoS mechanism may be positioned between the plaintext overlay networks 302 and the ciphertext underlay networks 308.

In embodiments, the desired quality of service (QOS) for the plaintext overlay network 302 is correlated with a logical Differentiated Services Code Point (DSCP) value within the plaintext underlay network 304. For example, the IP encryption device 110 may associate the logical DSCP value of the plaintext underlay network 304 with a corresponding DSCP value within the ciphertext overlay network 306. Subsequently, this logical DSCP value within the ciphertext overlay network 306 may be mapped to the QoS parameters of the ciphertext underlay network 308. These QoS parameters may indicate a priority, latency, throughput, or reliability value associated with the network 100.

In embodiments, the network architecture 100 incorporates preconfigured virtual unicast multicast Security Associations (SAs). These SAs may come paired with keys, with a preference for two keys to optimize interoperability. It is noted herein that the configuration of the network 100 is not limited strictly to two keys; rather, it may also accommodate setups utilizing three keys if required. This process involves leveraging preplaced keys, offering the advantage of streamlined link join procedures, provided that there is a successful key acquisition first. Moreover, the network 100 includes mechanisms for detecting other network nodes 102 and subsequently initiating Internet Key Exchange (IKE) sessions between them. It is further noted that the IKE handshake process may include a delay between the involved nodes 102.

In embodiments, the network 100 facilitates the deployment of a HAIPE discovery service, such as the Generic Discovery Service (GDS), which may feature a centralized or hierarchical GDS server. For instance, this service involves an IKE handshake delay between the node 102 and the GDS server, followed by an additional delay between the two nodes 102.

It is further noted herein the method or process 300 is not limited to the steps and/or sub-steps provided. The method or process 300 may include more or fewer steps and/or sub-steps. The method or process 300 may perform the steps and/or sub-steps simultaneously. The method or process 300 may perform the steps and/or sub-steps sequentially, including in the order provided or an order other than provided. Therefore, the above description should not be interpreted as a limitation on the scope of the disclosure but merely an illustration.

Figure 7:
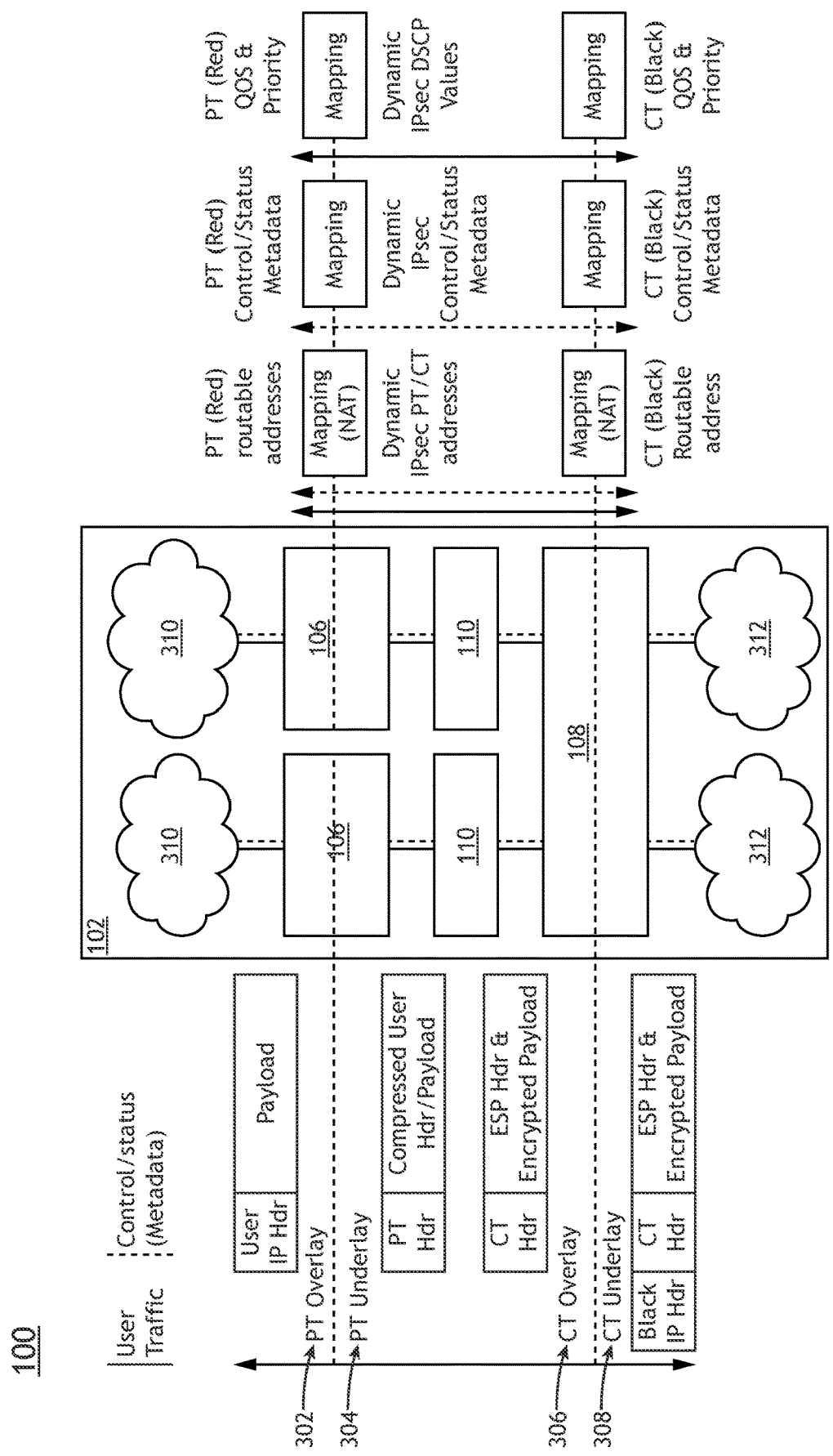
FIG. 7 is a simple diagram of a node within the network architecture including multicast SAs, in accordance with one or more embodiments of the present disclosure.

FIG. 7 is a simple diagram of a node 102 within the network architecture 100 including multicast SAs, in accordance with one or more embodiments of the present disclosure.

In embodiments, dynamic IPsec with multicast SAs introduces a nuanced approach to signaling within the network architecture 100. Unicast SA functionality is specifically tailored for signaling from black to red domains, primarily facilitated through cross domain guard or Cross Domain Solution (CDS) mechanisms. Conversely, multicast SA capabilities diverge by offering the flexibility of signaling through IGMP join, which can be bypassed either from black to red or from red to black. Moreover, multicast SA operations may also leverage Cross Domain Solutions (CDS) to ensure robust and secure communication across network domains. This multifaceted approach enables efficient and reliable signaling within the network 100, catering to diverse communication needs across different domains.

Figure 8:
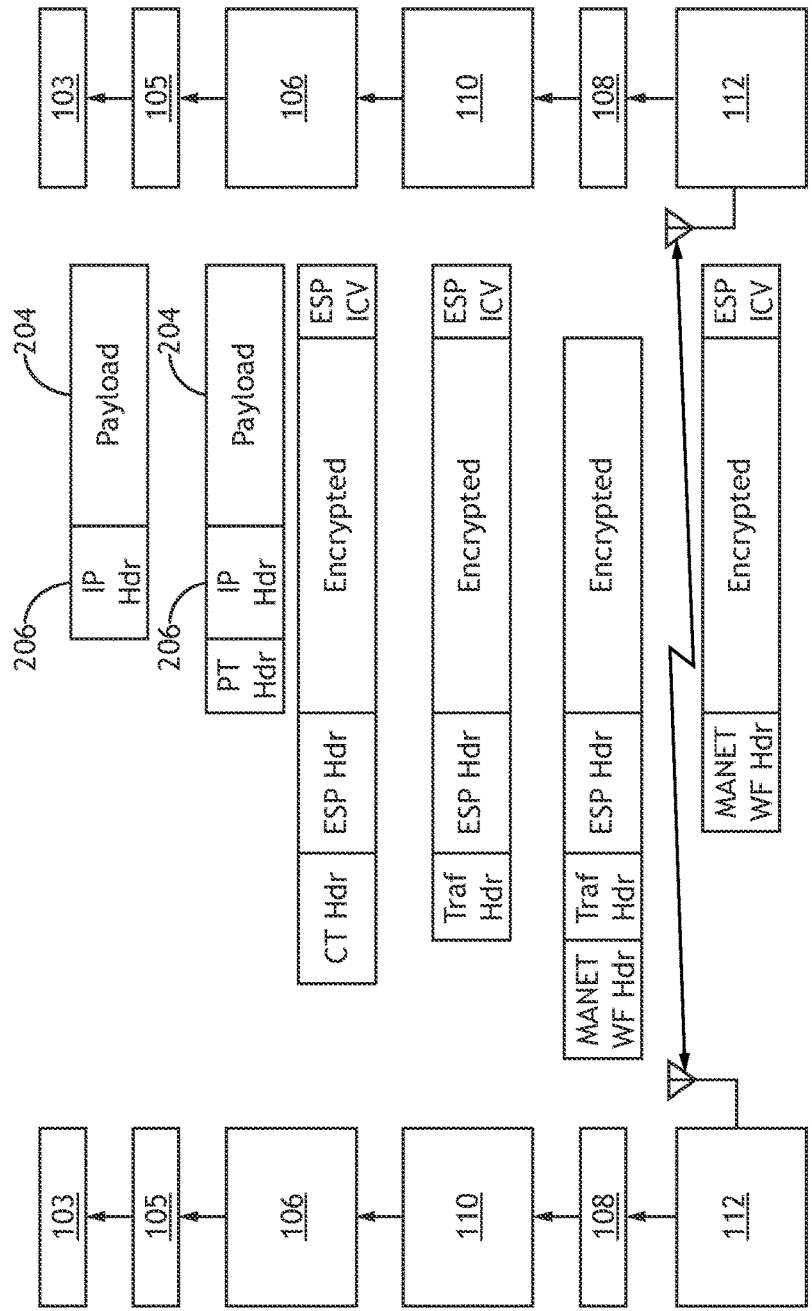
FIG. 8 illustrates a flow of user traffic through dynamic IPsec between two nodes, where the encrypted IP packet is segmented by the MANET waveform and reassembled at the destination, in accordance with one or more embodiments of the present disclosure.

FIG. 8 illustrates a flow of user traffic between two network nodes 102 of the plurality of network nodes 102, in accordance with one or more embodiments of the present disclosure. Each node 102 may include a host, a router, a PT-convergence module 106, an IP encryption device 110 (e.g., HAIPE device), a CT-convergence module 108, and a MANET waveform 112 (Mobile Ad hoc Network waveform).

In operation, a first node 102, designated as the source node 102, initiates the process of transmitting an IP packet. The host of the source node 102 generates the IP packet, which contains payload 204 data and a red overlay IP header 206. This packet is then forwarded by the router within the source node 102 to the PT-convergence module 106. The PT-convergence module 106 undertakes tasks such as encapsulating the packet using RFC 2003 IP in IP encapsulation, mapping the overlay PT header IP addresses to dynamic IPsec underlay addresses in an outer underlay CT header, and it may statelessly compress the overlay PT packet header and payload 204, if feasible. It is noted herein that the PT-convergence module 106 may adhere to RFC 3173 IPComp standards for compression, applied either to the entire packet and inner header or solely to the inner header. Subsequently, the IP encryption device 110 encrypts the packet to safeguard its contents. This encryption process encompasses encrypting the PT header, the IPcomp header, and the compressed header/payload of the IP packet.

Following encryption, the CT-convergence module 108 may be configured to compress the black overlay CT header, add the CT-convergence outer underlay traffic header, mapping CT overlay addresses and QoS parameters to MANET WF addresses, and append QoS information. The MANET WF 112 then manages the segmentation of the traffic packet (if necessary), adds MANET WF headers, and transmits the segmented packets to the MANET WF 112 of a second node 102 (e.g., destination node).

Upon reception at the destination node 102, the MANET WF 112 undertakes the reassembly of the traffic packet if it was segmented during transmission. Subsequently, the CT-convergence module 108 of the destination node 102 performs the task of uncompressing the CT header using the CT-convergence traffic header and MANET WF addresses, thereby retrieving the QoS information of the original packet. Next, the IP encryption device 110 decrypts the encrypted IP packet, thereby restoring its original contents. Following this, the PT-convergence module 106 inspects whether the packet is compressed; if so, it undergoes decompression and de-encapsulation. Finally, the router forwards the packet to the host on the destination node 102, which is configured to either receive or route the IP packet accordingly.

Figure 9:
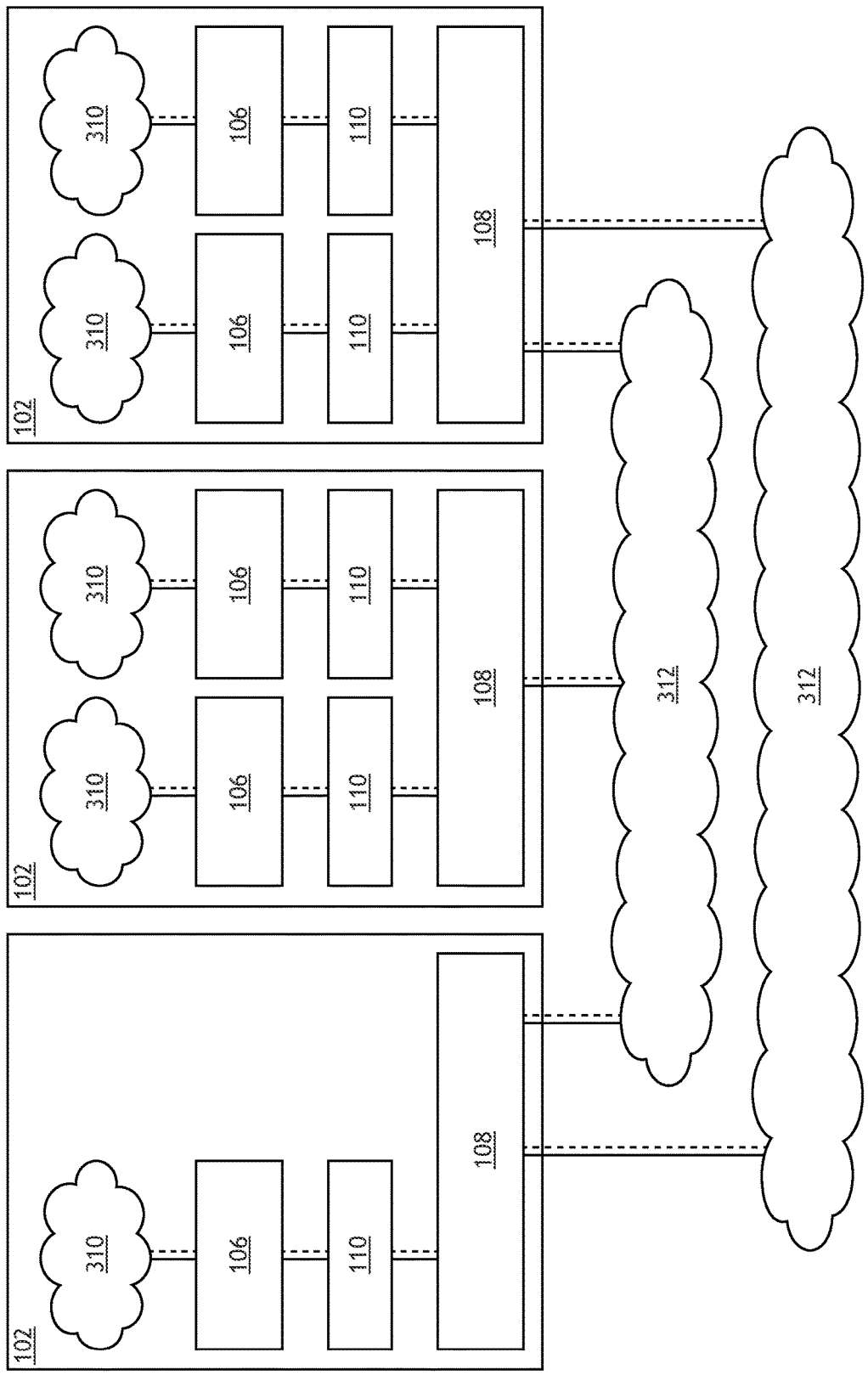
FIG. 9 illustrates a network architecture including a plurality of network nodes positioned above heterogeneous black networks, in accordance with one or more embodiments of the present disclosure.

FIG. 9 illustrates a network architecture 100 including a plurality of network nodes 102 positioned above heterogeneous black networks 312, in accordance with one or more embodiments of the present disclosure. Each node 102 within the network architecture 100 includes at least one of a security enclave 310, a PT-convergence module 106, an IP encryption device 110, and a CT-convergence module 108. It is noted herein that at least one of the nodes 102 may include distinct yellow and red sides for each component situated above the CT-convergence module 108.

In embodiments, the operation within the heterogeneous black networks 312 is facilitated by the CT-convergence module 108 of each node 102. For example, the CT-convergence module 108 may be configured to establish connections within the black core networks 312 situated below. These black core networks 312 may typically operate on IP protocols but may also extend to non-IP networks, offering versatility and adaptability within the network architecture 100.

In this operational setup, connectivity dynamics may undergo changes over time. However, it is noted that the dynamic IPsec overlay red and underlay black SAs remain invariant, ensuring consistent and secure communication channels within the network 100. Meanwhile, the CT convergence module 108 possesses the capability to dynamically select the most optimal black networks 312 and links to utilize, further enhancing the efficiency and resilience of the network architecture 100. In addition, the CT convergence module 108 may add additional security such as MP-QUIC with Transport Layer Security (TLS) to protect the black overlay network 306 information from malicious snooping or spoofing by a malicious entity with access to the black underlay networks 308.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A network architecture, comprising:
    a plurality of network nodes, wherein two or more network nodes are configured to communicate with each other among the plurality of network nodes;
    a plaintext overlay network situated atop a plaintext underlay network, the plaintext overlay and underlay networks configured to facilitate communication among the plurality of network nodes via one or more plaintext addresses associated with one or more nodes of the plurality of network nodes;
    a ciphertext overlay network situated atop a ciphertext underlay network, the ciphertext overlay and underlay networks configured to facilitate communication among the plurality of network nodes via one or more ciphertext addresses; and
    an IP encryption device positioned between the plaintext and ciphertext overlay networks, the IP encryption device configured to associate network addresses with corresponding logical security associations within the plaintext underlay networks and ciphertext overlay networks, wherein the logical security associations are associated with one or more network nodes of the plurality of network nodes.

2. The network architecture of claim 1, further comprising:
    a plaintext convergence function that associates the plaintext overlay network addresses to the plaintext underlay network addresses; and
    a ciphertext convergence function that associates the ciphertext overlay network addresses to the ciphertext underlay network addresses.

3. The network architecture of claim 2, further comprising a quality of service mapping mechanism positioned between the plaintext overlay networks and the ciphertext underlay networks, wherein:
    a desired plaintext overlay network quality of service is mapped at least one of to or from a logical plaintext underlay network differentiated services code point (DSCP) value,
    the IP encryption device maps the logical plaintext underlay network DSCP value at least one of to or from a logical ciphertext overlay network DSCP value,
    the logical ciphertext overlay network DSCP value is mapped at least one of to or from a ciphertext underlay network quality of service, and
    the quality of service is configured to indicate at least one of a priority, latency, throughput, or reliability value.

4. The network architecture of claim 3, wherein the association of plaintext overlay network and ciphertext underlay network addresses is dynamically discovered through a distributed process between the nodes without a network discovery server, wherein:
    the IP encryption device is further configured to establish a multicast security association between the nodes in the plaintext underlay network, and the multicast security association is configured for secure point-to-multipoint communication between the plaintext convergence functions,
    the plaintext underlay network address association to plaintext overlay network address at individual nodes is discovered via exchange of multicast messages between the plaintext convergence functions, and
    the ciphertext overlay network address associated with an individual node ciphertext underlay network address is discovered via exchange of multicast messages between the ciphertext convergence functions.

5. The network architecture of claim 3, wherein a connectivity between the plaintext convergence functions of the plurality of network nodes can be discovered via one or more of:
    the plaintext convergence functions exchanging plaintext underlay network routing information between plaintext convergence functions of the plurality of network nodes, and
    the ciphertext convergence function transmitting internet group multicast protocol (IGMP) join messages through the IP encryption device to the plaintext convergence function for the unicast-equivalent multicast address for every other node in the network and an IGMP leave message when another node is no longer in the network.

6. The network architecture of claim 3, wherein one or more keys associated with one or more security associations are configured through either pre-shared keys or learned via Internet Key Exchange (IKE).

7. The network architecture of claim 2, wherein the IP encryption device is further configured to establish a multicast security association between the nodes in the plaintext underlay network where the multicast security association is configured for secure point-to-multipoint communication between the plaintext convergence functions and at least one of:
    logical unicast security associations between one or more pairs of network nodes within the plaintext underlay and ciphertext overlay networks, each unicast security association configured for secure point-to-point communication between the one or more pairs of network nodes that are associated with the plaintext underlay and ciphertext overlay network node addresses, or logical unicast-equivalent multicast security associations between the network nodes within the plaintext underlay network, where only one plaintext convergence function performs an Internet Group Management Protocol (IGMP) join of a given logical unicast equivalent multicast security association so that traffic sent to that logical unicast equivalent multicast address is delivered to a single network node that joined the logical unicast equivalent multicast security association plaintext and ciphertext multicast addresses.

8. The network architecture of claim 7, wherein at least one of the plaintext underlay and ciphertext overlay network addresses of the logical unicast security associations or the plaintext underlay network addresses of the logical unicast-equivalent multicast security association are associated with an individual node through at least one of preconfiguration at the individual node, or dynamic discovery through a process between the individual node and a network discovery server through dynamic discovery of a decentralized process among the individual node without reliance on a network discovery server.

9. The network architecture of claim 7, wherein at least one of the plaintext underlay network unicast or unicast-equivalent multicast address association with individual nodes is discovered via exchange of multicast messages between the plaintext convergence functions that uniquely associate at least one of a plaintext underlay network unicast address or a unicast-equivalent multicast address to an individual node within the network.

10. The network architecture of claim 7, wherein the ciphertext overlay network address associated with an individual node is determined through at least one of:

extracting from a source address of an IP encrypted unicast packet transmitted by the plaintext convergence function at the individual node, and deriving from the ciphertext unicast-equivalent address in an internet group multicast protocol (IGMP) join message bypassed through the IP encryption device from the plaintext convergence function to the ciphertext convergence function.

11. The network architecture of claim 2, wherein a mapping of plaintext overlay network addressing and routing to plaintext underlay network addresses at individual nodes is discovered by the plaintext convergence function at each respective node and subsequently shared with the plaintext convergence functions across the plurality of network nodes.

12. The network architecture of claim 2, wherein a mapping of ciphertext overlay networks to ciphertext underlay network addressing and routing is discovered via exchange of topology information between the ciphertext convergence functions of the plurality of network nodes.

13. The network architecture of claim 2, wherein communication between the plaintext convergence and ciphertext convergence functions utilize cross domain solution signaling, allowing a transmission of at least one of topology or quality of service data, wherein the quality of service data includes at least one of priority, latency, throughput, and reliability data.

14. The network architecture of claim 1, further comprising two or more plaintext overlay and underlay networks above a single cipher text underlay and overlay network.

15. The network architecture of claim 1, wherein the communication between the plaintext overlay and the ciphertext underlay networks comprises one or more compression optimizations to reduce overhead and enhance data transmission efficiency.

16. The network architecture of claim 1, wherein the IP encryption device is configured to support at least one of IPV4 or IPv6.

17. The network architecture of claim 1, wherein the IP encryption device is configured to provide at least one of an encapsulate security payload (ESP) or authentication header to a data packet, and operate in at least one of a tunnel or transport mode.

18. The network architecture of claim 1, wherein the IP encryption device is configured as at least one of an Internet Protocol Security (IPsec), a High Assurance Internet Protocol Encryptor (HAIPE), a Network and Information Infrastructure Internet Protocol Network Encryption (NINE), or an IPsec Minimum Essential Interoperability Requirements (MPIER) device.

19. A method, comprising:

providing a plurality of network nodes, wherein two or more network nodes are configured to communicate with each other among the plurality of network nodes;

constructing a plaintext overlay network atop a plaintext underlay network, wherein the plaintext overlay and underlay networks are configured to facilitate communication among the plurality of network nodes via one or more plaintext addresses associated with one or more nodes of the plurality of network nodes;

constructing a ciphertext overlay network atop a ciphertext underlay network, wherein the ciphertext overlay and underlay networks are configured to facilitate communication among the plurality of network nodes via one or more ciphertext addresses;

positioning an IP encryption device between the plaintext and ciphertext overlay networks; and configuring the IP encryption device to associate network addresses with corresponding logical security associations within the plaintext underlay networks and ciphertext overlay networks, wherein the logical security associations are associated with one or more network nodes of the plurality of network nodes.

20. The method of claim 19, further comprising:

associating plaintext overlay network addresses to plaintext underlay network addresses via a plaintext convergence function; and associating ciphertext overlay network addresses to ciphertext underlay network addresses using a ciphertext convergence function.

* * * * *